March 14, 1967   R. D. LAMBERT   3,308,497
POWER-OPERATED LOADING RAMP
Original Filed Nov. 14, 1962   6 Sheets-Sheet 1
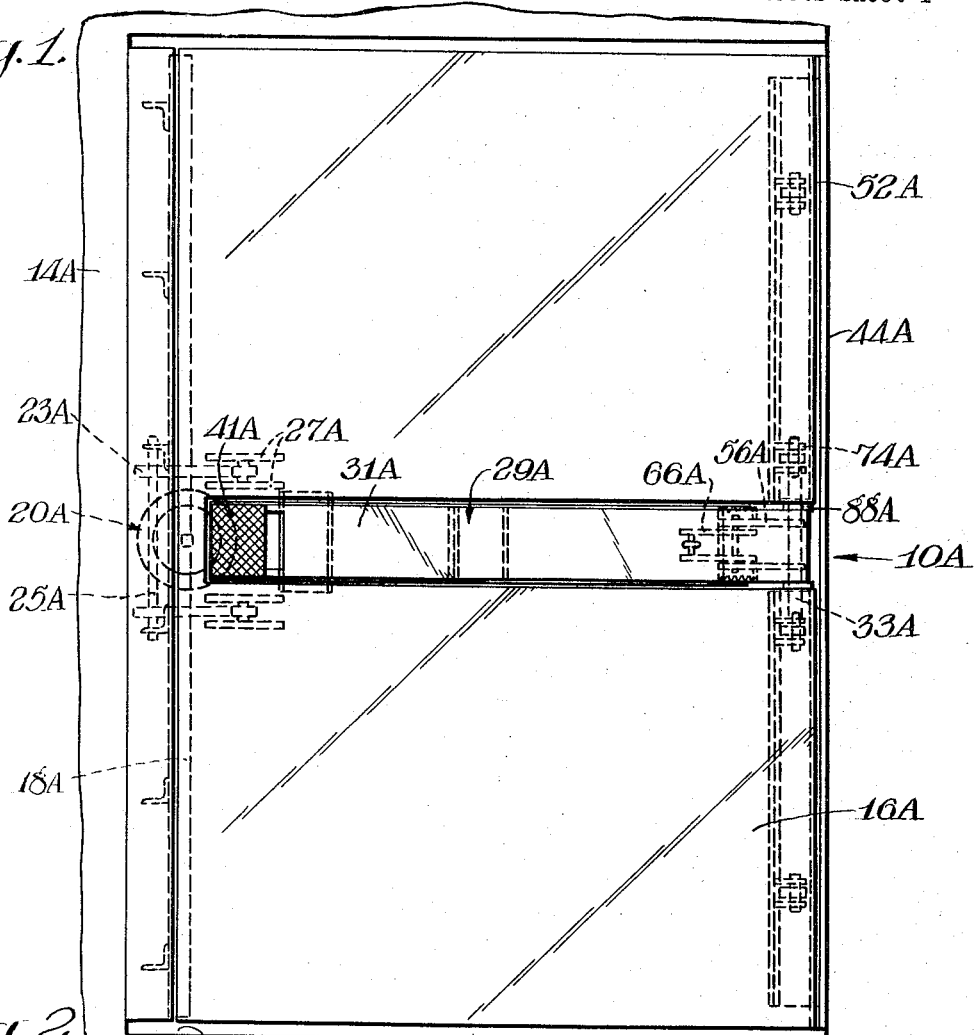
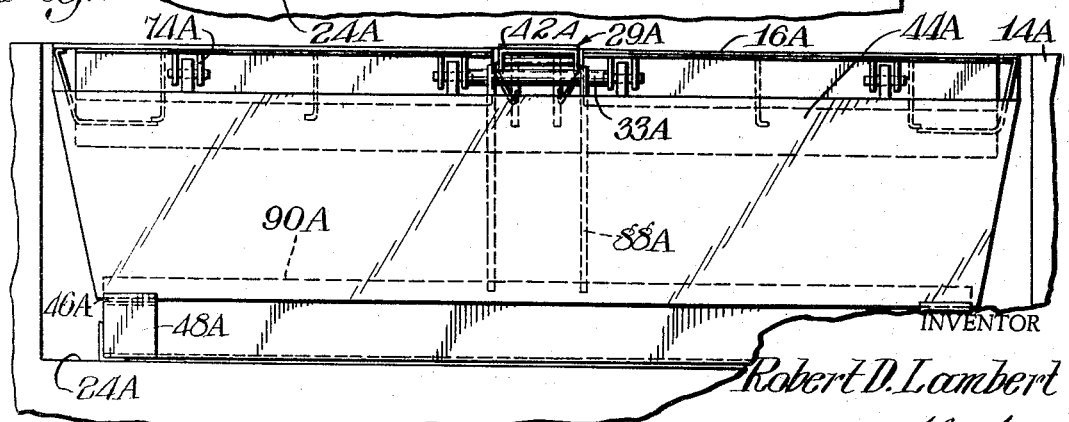
INVENTOR
Robert D. Lambert
BY Connolly and Hutz
ATTORNEYS

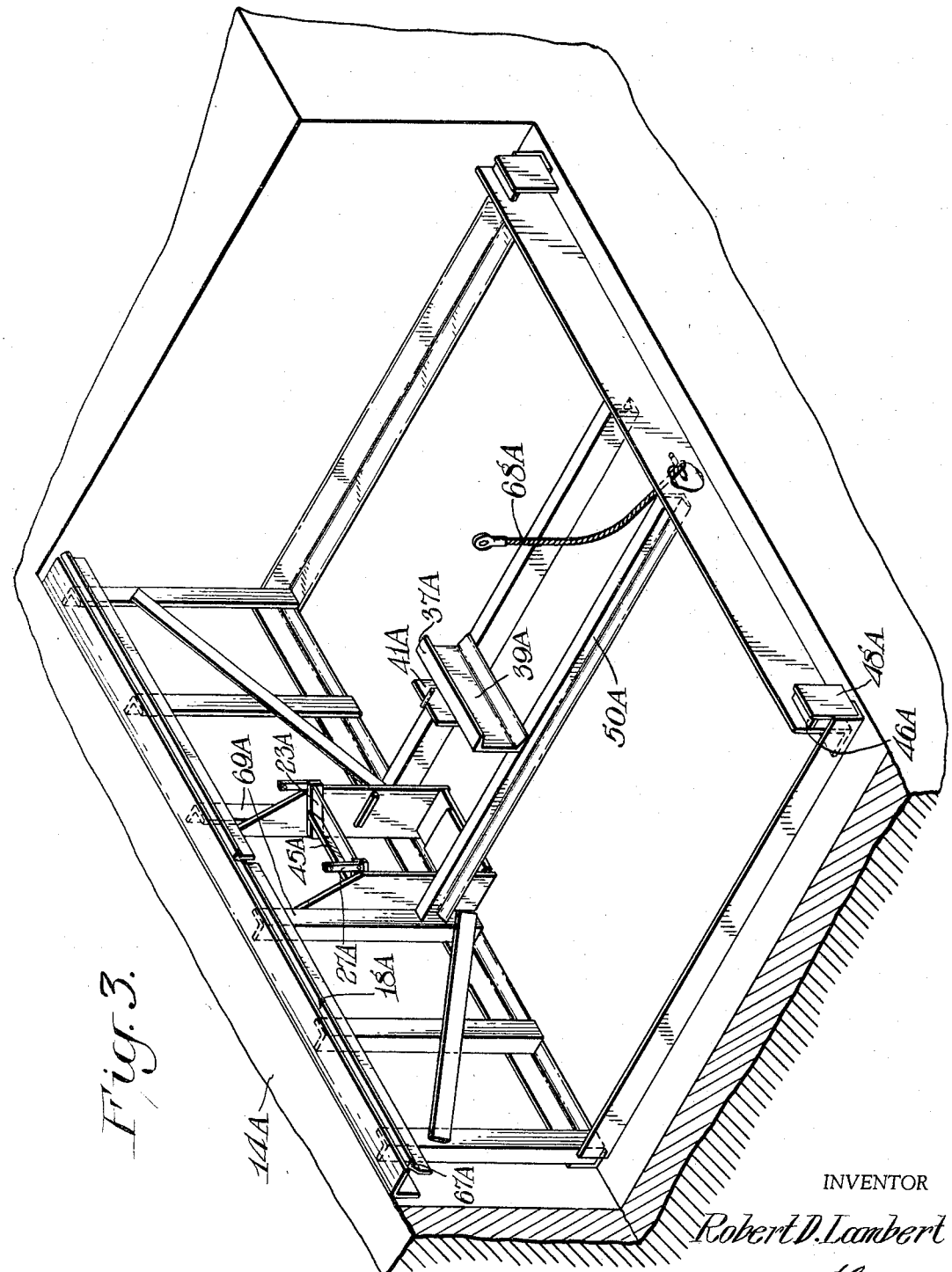

March 14, 1967 R. D. LAMBERT 3,308,497
POWER-OPERATED LOADING RAMP
Original Filed Nov. 14, 1962 6 Sheets-Sheet 3
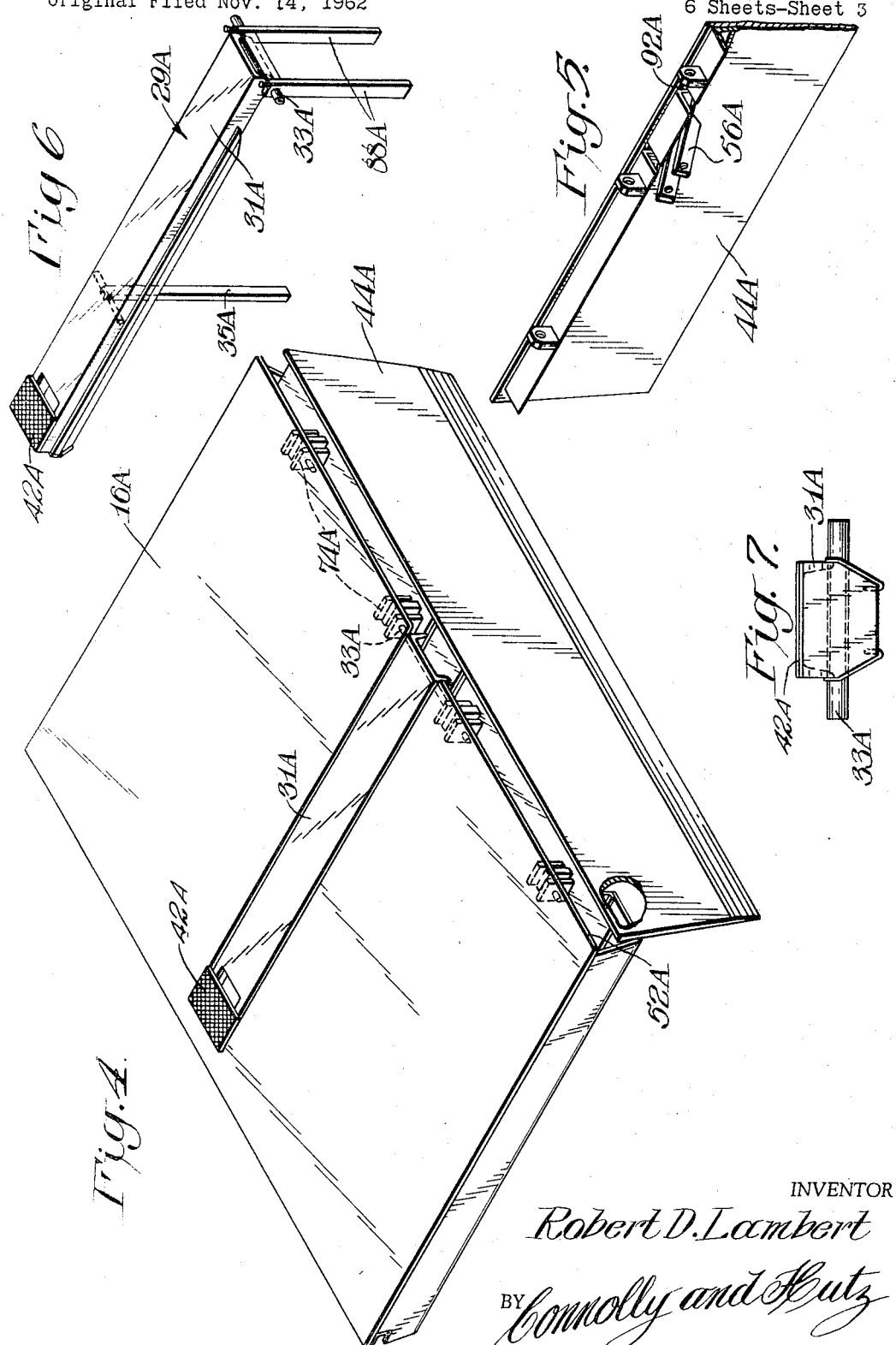
INVENTOR
Robert D. Lambert
BY Connolly and Hutz
ATTORNEYS March 14, 1967 R. D. LAMBERT 3,308,497
POWER-OPERATED LOADING RAMP
Original Filed Nov. 14, 1962 6 Sheets-Sheet 4

INVENTOR
Robert D. Lambert
BY Connolly and Hutz
ATTORNEYS

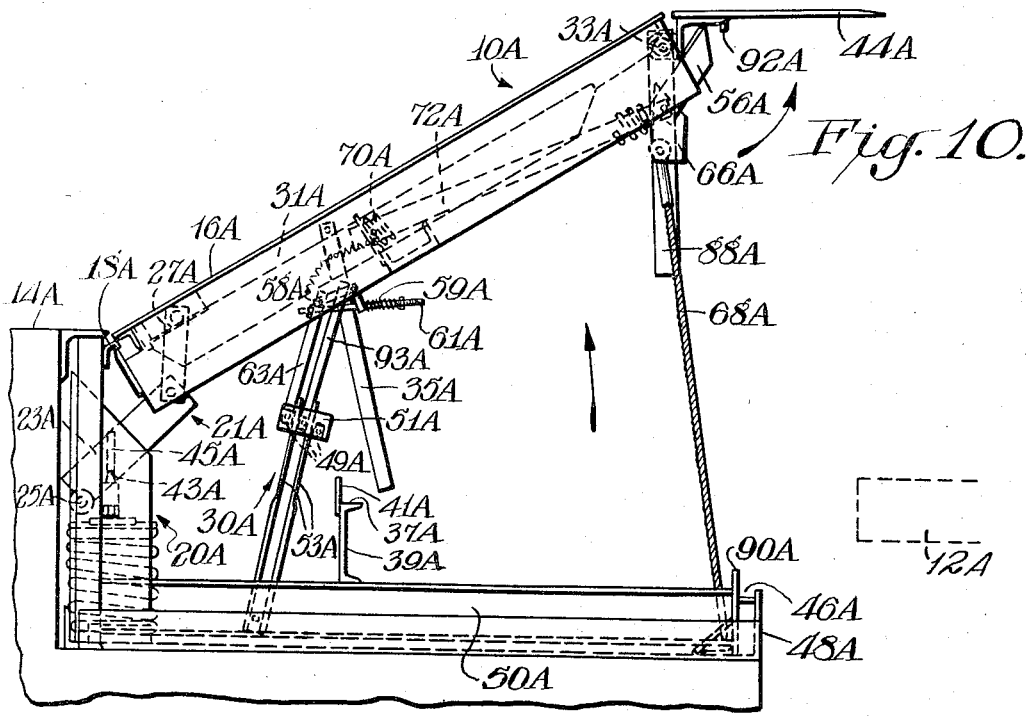
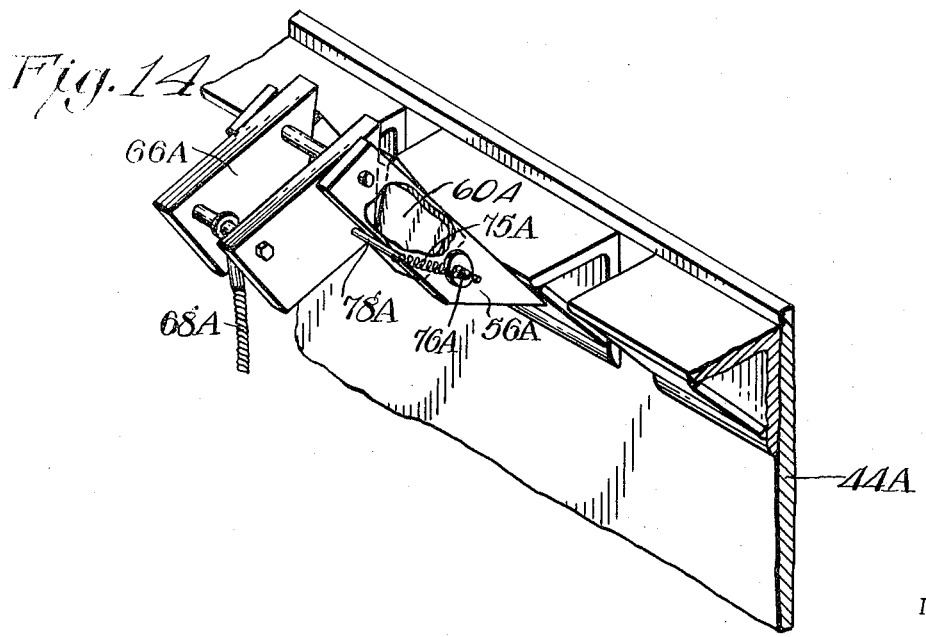

March 14, 1967   R. D. LAMBERT   3,308,497
POWER-OPERATED LOADING RAMP
Original Filed Nov. 14, 1962   6 Sheets-Sheet 6
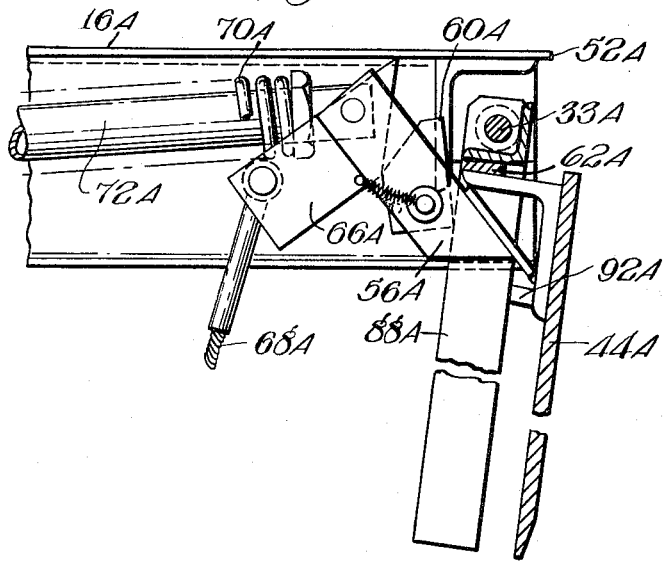
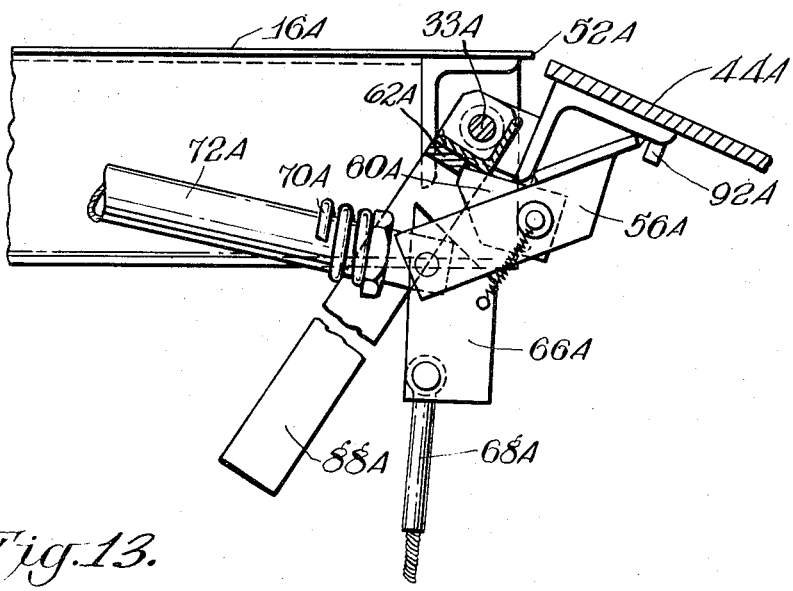
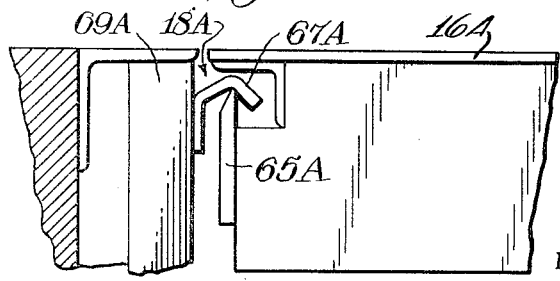
INVENTOR
Robert D. Lambert
BY Connolly and Hutz
ATTORNEYS

United States Patent Office 3,308,497
Patented Mar. 14, 1967

3,308,497
POWER-OPERATED LOADING RAMP
Robert D. Lambert, Fort Wayne, Ind., assignor to Symington Wayne Corporation, Salisbury, Md., a corporation of Maryland
Original application Nov. 14, 1962, Ser. No. 237,691, now Patent No. 3,255,478, dated June 14, 1966. Divided and this application Sept. 14, 1965, Ser. No. 496,221
11 Claims. (Cl. 14—71)

This application is a division of Serial No. 237,691; filed November 14, 1962, now Patent No. 3,255,478.

This invention relates to a power-operated ramp for bridging the space between a loading dock and a truck parked next to it, and it more particularly relates to such a ramp in which power is only used while elevating it.

Various arrangements have been used for power operating a ramp which bridges the space between a loading dock and the varying level bed of a truck parked next to it. When such power-operated systems operate continuously to control the position of the ramp, they are subject to undue wear and complication.

An object of this invention is to provide an automatic power-operated ramp in which the cycle of operation of the power system is minimized.

Another object is to provide such a ramp which is elevated by spring means.

In accordance with this invention a powered elevating means is used to raise the platform to an upwardly inclined position above the bed of a vehicle, and it is then inactivated to lower the platform and cause to freely rest upon the vehicle bed. A retarding means reacts between the platform and the dock to prevent the platform from dropping too fast when the power system is inactivated. This permits the power elevating system to be used only for raising the platform above a vehicle bed so that it can then be dropped down upon it. Thereafter it freely rests upon the vehicle bed and automatically conforms to its varying level. When the vehicle drives away, the unsupported ramp slowly lowers with its retarding means preventing it from dropping too fast and sustaining any damage. The power-elevating means may be a varying-moment spring system which is capable of maintaining the platform in a raised condition only when it is above a predetermined angle of inclination, and an auxiliary lifting means may be utilized to raise the platform to that predetermined angle. While the ramp is being raised to the elevated position in readiness for dropping upon a vehicle bed, the retarding means may be disengaged to prevent it from interfering with the raising of the ramp.

Novel features and advantages of the present invention will become apparent to one skilled in the art from a reading of the following description in conjunction with the accompanying drawings wherein similar reference characters refer to similar parts and in which:

FIGS. 1 and 2 are respectively top plan and front elevatioanl views of a spring-powered embodiment of this invention;

FIG. 3 is a three-dimensional view of the framework of the ramp of FIGS. 1 and 2;

FIG. 4 is a three-dimensional view of the movable platform portion of the ramp of FIGS. 1 and 2;

FIG. 5 is a three-dimensional rear view of a portion of the lip shown in FIG. 4;

FIGS. 6 and 7 are respectively three-dimensional front and rear elevational views of the lifting pedal of the ramp of FIGS. 1 and 2;

FIGS. 8–10 are side elevational views of the ramp of FIGS. 1 and 2 in various phases of operation;

FIGS. 11 and 12 are side elevational views of the lip of the ramp of FIGS. 1 and 2 in different phases of operation;

FIG. 13 is an enlarged side elevational view of the hinge of the ramp of FIGS. 1 and 2; and FIG. 14 is a three-dimensional view of the lip operating linkage attached to the front of the ramp of FIGS. 1 and 2.

Figure 8:
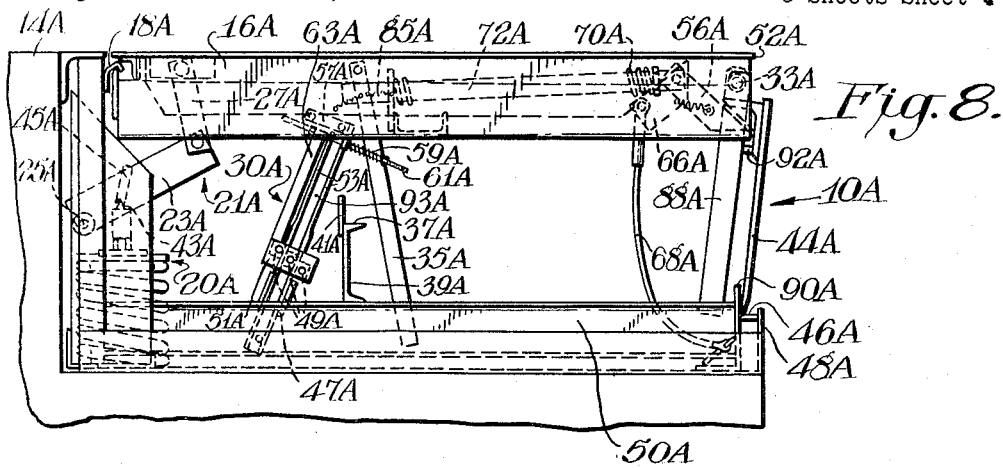
Figure 9:
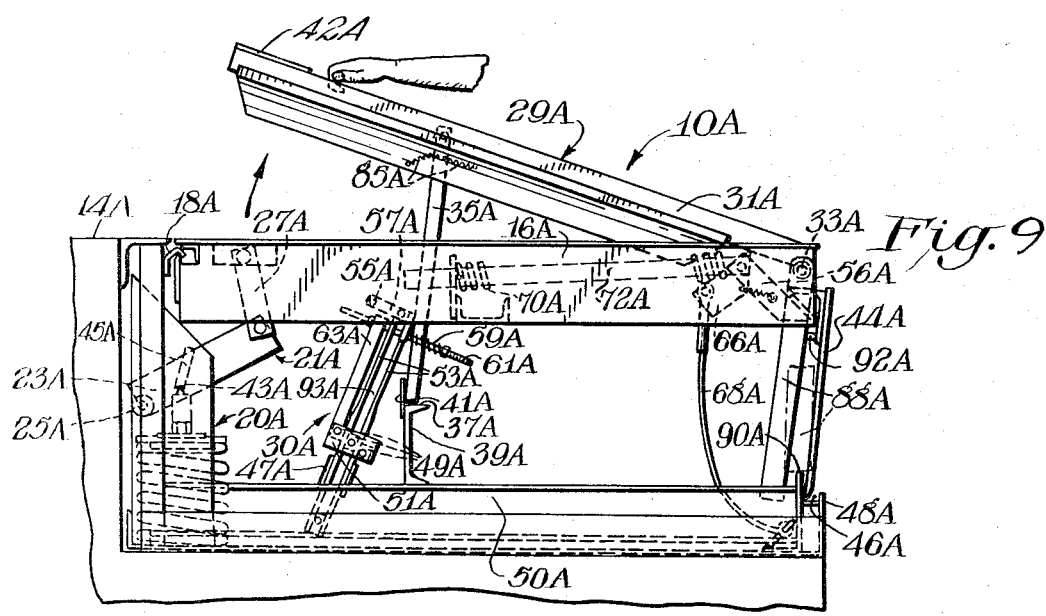

In FIGS. 1 and 2 is shown a power operated ramp 10A for bridging the space between a vehicle bed and a loading dock 14A comprising a platform 16A connected to loading dock 14A by a hinge 18A. A powered elevating means 20A reacts between the bottom of pit 24A in loading dock 14A and platform 16A to rotate it upwardly about hinge 18A. As shown in FIGS. 8 and 9 the powered elevating means 20A comprises a compression spring 20A reacting upwardly against a varying moment linkage 21A connected slightly forward of hinge 18A. Varying moment linkage 21A includes a bar 23A rotatably mounted to frame 50A about a pivot 25A, and connecting link 27A rotatably connects bar 23A to the bottom of platform 16A. As platform 16A rotates upwardly about hinge 18A, the varying moment applied to platform 16A from spring 20A through linkage 21A causes the counterbalancing effect of spring 20A upon ramp 10A to vary. Ramp 10A is accordingly counterbalanced up when the platform slope is greater than 25° and down when less than 25°. The control force to raise ramp 10A from the counterbalanced down position shown in FIGS. 8 and 9 to the raised position shown in FIG. 10 is provided by an auxiliary lifting means 29A. Auxiliary lift 29A includes a foot pedal 31A rotatably connected about pivot 33A at the front of ramp 10A in a manner in which it can be raised upwardly as shown in FIG. 9 to engage rotatably depending strut 35A substantially vertically aligned below it by a pair of springs 85A connected to a stringer of ramp 10A. When the bottom of strut 35A engages step 37A provided by channel 39A and plate 41A, it provides a lever by which the weight of a man applied to pad 42A at the rear of foot pedal 31A is transmitted to help raise ramp 10A. The weight of a man applied to pad 42A cooperates with the force of main spring 20A, acting through knife edge 43A, grooved bar 45A and varying moment linkage 21A, flips ramp 10A from the lowered crossover position shown in FIG. 9 to the raised position shown in FIG. 10.

As shown in the drawings, a movable lip 44A is mounted at the front end of platform 16A for engaging the bed of a truck. In the crossover position, lip 44A hangs substantially vertically downward, as shown in FIGS. 8 and 9, and rests within crossover slot 46A in beam 48A connected across the front of frame 50A. In the working or bridging position lip 44A is actually inclined approximately 6° downwardly to provide a smooth transition between the surface of platform 16A and the bed of a truck. In this working position lip 44A is engaged with the front edge 52A of platform 16A and thereby prevented from rising any further upwardly with respect to platform 16A.

In FIG. 12 is shown the ready position of lip 44A in which it is raised to within approximately 20° of the horizontal, and in this position arresting lug 60A rotatably connected to lip actuating arm 56A moves into engagement with arresting bar 62A on one of the two safety legs 88A.

The engagement of arresting lug 60A with a portion of safety leg 88A rotates it slightly backwardly from a position in which it would engage the top of bar 90A at the back of crossover slot 46A upon downward movement in contact therewith. However when lip 44A is moved upwardly from the ready position, which in this example is 20° below horizontal, the disengagement of arresting lug 60A allows safety legs 88A to drop forwardly to a position in which they will engage the top of beam 90A and prevent the platform 10A from dropping to the crossover position should it reach that point before lip 44A can drop into crossover slot 46A.

The engagement of the arresting lug 60A is assisted by the downward pull on lip actuating arm 56A of cable link 66A, which is rotatably connected to the end thereof. Link 66A is pulled downwardly by the taut pulling of cable 68A anchored to the bottom of frame 50A when the ramp 10A is elevated to the position shown in FIG. 12. The upward rotation of lip 44A to the ready position is facilitated by the reaction of compression spring 70A mounted about bar 72A between the platform 16A and bar 72A in a direction to rotate lip 44A and actuating arm 56A upwardly about its hinge 33A. Spring 70A accordingly helps counterbalance the weight of lip 44A, facilitates its upward movement and checks its downward swing.

In FIGS. 8, 9 and 10 is shown retarding device 30A which includes a pivoted fork 47A rotatably connected to frame 50A. Fork 47A is engaged by snubbing blocks 49A mounted within snubbing box 51A, which is rotatably supported by rod 93A from platform 16A. Tines 53A slide in frictional engagement between snubbing blocks 49A to retard the drop of ramp 10A when it is left unsupported by a truck bed. Retarding device 30A is made inactive when foot pedal 31A is raised as shown in FIG. 9. The raising of the lower edge of pedal 31A away from pin 55A on spring lever 57A relieves the tension of compression spring 59A on spring guide 61A acting in FIG. 8 to pull and strain snubbing box lever 63A. This strain tilts snubbing box 51A with respect to tines 53A. This causes bronze snubbing blocks 49A to bind against steel tines 53A and retard the downward movement of ramp 10A with respect to loading dock 14A. However when foot pedal 31A is raised as shown in FIG. 9, this releases the tension of spring 59A on snubbing box lever 63A, which allows the lifting control provided by the weight of a man applied to foot pedal platform 31A to freely raise ramp 10A or flip it upwardly into the counterbalanced upward position shown in FIG. 10. Also as shown in FIG. 10, the top portions of tines 53A are shaved, for example, by as much as 1/16 of an inch to prevent the snubbing blocks 49A from applying friction to them until platform 16A falls approximately to an angle 15° above horizontal. This allows the platform to move freely throughout its upper portion of movement where it need not be retarded for safety.

As shown in FIG. 13, hinge 18A is reverse-acting for the most part. Hinge 18A includes a knife edged bar 65A connected to the rear of platform 16A which engages upwardly within a convexly curved hinge plate 67A connected to the front edge of loading dock 14A adjacent the rear of platform 16A by vertical frame support angles 69A. Hinge 18A is self-cleaning because any dirt falling between the space between the rear of platform 16A and the adjacent edge of loading dock 14A falls freely between vertical frame support angles 69A to which hinge plate 67A is welded. Knife edged bar 65A transmits the upward force of the main spring 20A which is on the order of 8,000 to 15,000 pounds. Any downward force in excess of this brings hinge plate 67A into contact with the top of knife edged bar 65A. The spaces between frame support angles 69A to which hinge 67A is welded allow any dirt falling between them to drop past the hinge 18A to the bottom of pit 24A.

Ramp 10A is usually in the crossover position when the truck drives in front of it. Either an operator on the dock or the truck driver pulls foot pedal 31A upwardly to engage strut 35A on step 37A, and then his weight on pad 42A flips ramp 10A upwardly into the raised position shown in FIG. 10. As ramp 10A moves towards this position, the pull of cable 68A on the bottom of the actuating assembly for lip 44A moves arresting lug 60A into contact with arresting bar 62A on safety legs 88A thereby maintaining lip 44A poised approximately at an angle 20° below the horizontal. As ramp 10A lowers into contact with the bed 12A of a truck by walking it down, arresting lug 60A is released from arresting bar 62A thereby freeing lip 44A for subsequent downward movement and allowing safety legs 88A to drop into the forward position for engaging the top of beam 90A in back of crossover slot 46A which receives the tip of lip 44A. Upon this downward movement, snubbing blocks 49A by the inclination of snubbing lever 63A by spring 59A, causes snubbing blocks 49A to frictionally engage the wider portions of tines 53A of fork 47A at angles of inclination below 15° above the horizontal. This retards the lowering movement of ramp 10A and prevents it from dropping too fast.

Should ramp 10A drop too fast when left unsupported, for example when an appreciable load remains upon it, safety legs 88A strike the top of beam 90A. When lip 44A moves into the crossover position, lugs 92A upon their rear force safety legs 88A backwardly to allow ramp 10A to drop the remaining distance with the tip of lip 44A dropping into slot 46A. Should ramp 10A be dropped from the bed of its truck 12A when the ramp is in the below horizontal position, it is raised by the operator to an upwardly inclined position after which it lowers in the normal fashion to the crossover position. Should too much load be imposed upon the ramp in the below horizontal position, safety legs 88A engage the bottom of the pit 24A to prevent ramp 10A from being forced downwardly. When the load is removed, ramp 10A can be restored to the crossover position by raising foot pedal 31A and flipping it upwardly after which lip 44A returns to the crossover position as previously described.

What is claimed is:

1. A power-operated ramp for bridging the space between a vehicle bed and a loading dock comprising a platform, hinge means for connecting the rear of said platform to the edge of said loading dock, powered elevating means capable of reacting between said loading dock and said platform for rotating it upwardly about said hinge means, a control means connected to said platform arranged to cooperate with said powered elevating means to raise said platform to an upwardly inclined position above the bed of a vehicle and to cause said platform to lower under the influence of gravity and freely rest upon said bed, and a retarding means capable of reacting between said platform and said loading dock for preventing said platform from dropping too fast when its outer end is unsupported, said powered elevating means comprising a varying moment spring means capable of reacting between said platform and said loading dock to maintain said platform in a substantially raised condition only when it is above a predetermined angle of inclination, and said control means comprising an auxiliary lifting means capable of reacting between said platform and said loading dock for causing said platform to rise from a position below said predetermined angle to one above it.

2. A ramp as set forth in claim 1 wherein interlocking means connects said auxiliary lifting means to said retarding means for disengaging it when said auxiliary lifting means is being operated.

3. A ramp as set forth in claim 1 wherein said powered elevating means comprises a compression spring capable of being upon said loading dock, a varying moment force-applying linkage capable of being movably connected between said platform and said loading dock adjacent said hinge means, and a knife edge and anvil force-transmitting means reacting between said compression spring and said linkage which comprises a varying moment transmission between said spring and said platform.

4. A ramp as set forth in claim 1 wherein said retarding means comprises a friction linkage capable of being connected between said loading dock and said platform, and interlocking means connects said control means to said friction linkage for disengaging said friction linkage while said auxiliary lifting means is being operated.

5. A ramp as set forth in claim 1, wherein said auxiliary lifting means comprises a pedal section longitudinally disposed upon said platform, pedal hinge means rotatably connecting the portion of said pedal section adjacent the free end of said platform to said platform, a substantially vertical strut rotatably connected to said pedal sections, a step capable of being upon said loading dock, and biasing means urging said strut into engagement with said step when said pedal section is raised for causing a weight applied to the end of said pedal section to constitute said auxiliary lifting means.

6. A ramp as set forth in claim 4 wherein said friction linkage comprises rod means capable of being rotatably connected to said loading dock, a snubbing box, bar means rotatably connecting said snubbing box to said platform, said rod means being inserted within said snubbing box, snubbing blocks mounted within said snubbing box in a sliding engagement with said bar means, and spring biasing means connected to said snubbing box for urging said snubbing blocks into frictional engagement with said bar to retard the downward movement of said platform.

7. A ramp as set forth in claim 6 wherein said spring biasing means incorporates an actuating means, and said interlocking means connecting said actuating means to said pedal section for releasing said spring biasing means from said snubbing box to free it from frictional engagement with said rod means to facilitate upward movement by said ramp by operation by said auxiliary means.

8. A ramp as set forth in claim 7 wherein said rod means comprises a fork having a pair of tines, said snubbing box retaining three snubbing blocks having a pair of spaces therebetween, said tines being inserted in said spaces between said snubbing blocks, a biasing lever connected to said snubbing box and extending upwardly toward said platform, said spring biasing means incorporating an actuating lever rotatably mounted beneath said platform for engaging said pedal section when it is in the inactive condition in line with said platform for causing it to apply spring pressure to said biasing lever whereby said snubbing blocks are frictionally engaged with said tines, and said pedal section when raised being disengaged from said actuating lever for releasing said spring pressure and said frictional engagement.

9. A ramp as set forth in claim 8 wherein the upper portion of said tines are reduced in cross section to release the frictional engagement of said retarding means when said platform is above a predetermined angle of inclination.

10. A ramp as set forth in claim 1 wherein a movable lip is connected to the front of said platform by a lip hinge, a substantially vertical safety leg means rotatably connected to the front of said platform adjacent said lip hinge, a lip elevating linkage connected between the front of said platform and said lip hinge, cable means capable of connecting said lip elevating linkage to said loading dock for raising said lip to a partially raised "ready" position when said platform is fully raised, releasable arresting means connected to said lip for maintaining it in said ready condition until it is raised further by contact with said vehicle bed, part of said releasable connecting means being mounted upon the top of said safety leg, a frame capable of being upon said loading dock for supporting said ramp, said frame incorporating a crossover slot for receiving said lip when it drops vertically down, and said safety leg means being arranged to have its bottom edge strike said frame in back of said crossover slot when not engaged by said lip in said "ready" and "dropped" positions for catching the fall of said ramp when it drops before said lip can engage said crossover slot.

11. A ramp as set forth in claim 10 wherein a resilient counterbalancing assembly reacts between the front of said platform and said lip and partially balances its weight whereby its elevation is facilitated and its downward movement checked and cushioned.

References Cited by the Examiner
UNITED STATES PATENTS

| | | | |
|---|---|---|---|
| 3,059,258 | 10/1962 | Holleen | 14—71 |
| 3,117,332 | 1/1964 | Kelley | 14—71 |
| 3,167,796 | 2/1965 | Layne | 14—71 |
| 3,204,270 | 9/1965 | Fenton | 14—71 |

CHARLES E. O'CONNELL, *Primary Examiner.*

N. C. BYERS, *Assistant Examiner.*